April 3, 1951     M. A. HOLBROOK     2,547,209
SAFETY GUARD FOR COASTING SLEDS
Original Filed June 13, 1941
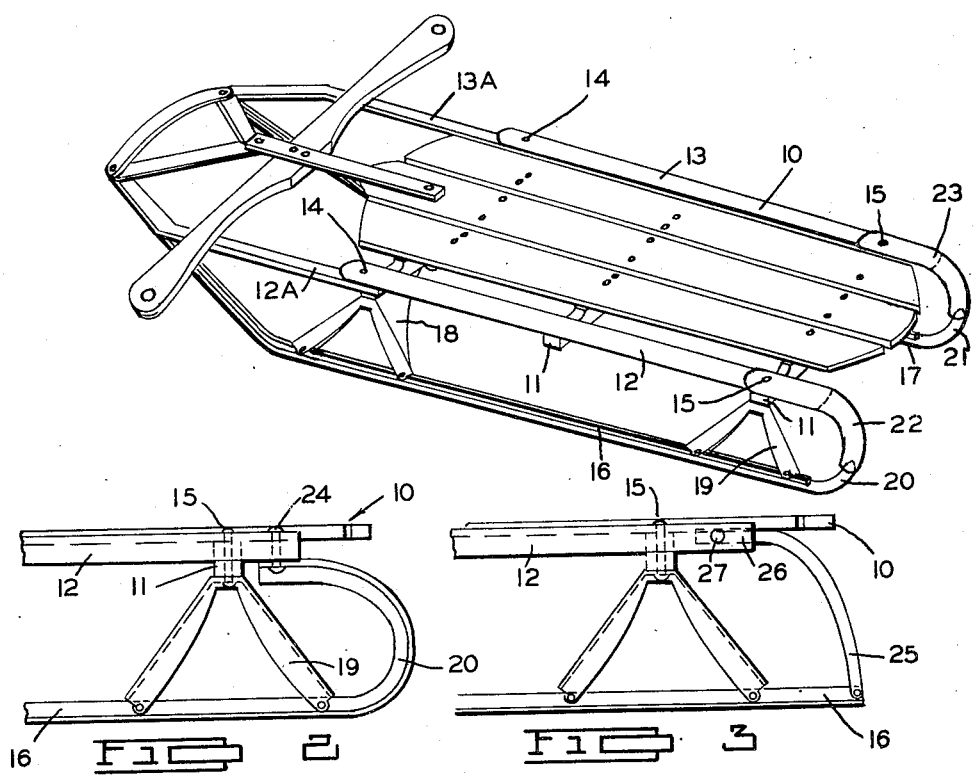
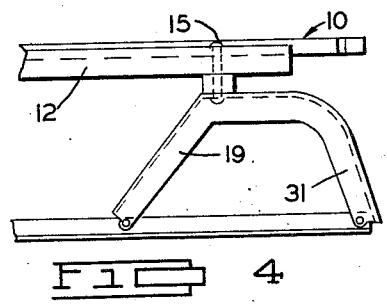
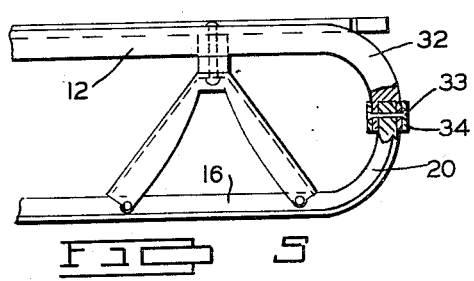
*INVENTOR.*
MAX A. HOLBROOK
BY Gray and Smith
ATTORNEYS Patented Apr. 3, 1951

2,547,209

UNITED STATES PATENT OFFICE 2,547,209

SAFETY GUARD FOR COASTING SLEDS

Max A. Holbrook, Coldwater, Mich., assignor to Pratt Manufacturing Company, Coldwater, Mich., a limited copartnership Original application June 13, 1941, Serial No. 397,847. Divided and this application April 14, 1945, Serial No. 588,354

1 Claim. (Cl. 280—12)

The present invention relates to safety coasting sleds provided with means for guarding or eliminating the sharp ends of the runner.

The present application is a division of my Patent No. 2,390,256, filed June 13, 1941.

It is one object of the invention to provide a safety sled in which the rearwardly extending end portions of the runners are covered or protected by guard means connecting said end portions to other parts of the sled; thereby preventing the painful cuts or injuries to children which have often occurred heretofore because of accidental bodily contact with the sharp, projecting, unprotected runner ends of conventional sleds.

Another object of the invention is to provide runner protecting means which may be incorporated in a sled structure having the usual wooden side rails.

It is a more specific object of the invention to provide runner protecting means of the foregoing general character which may be utilized with runners bent at their end portions; and to provide protecting means which may be utilized to guard the sharp ends of conventional straight ended runners. Furthermore, my runner protecting means may be incorporated in a conventional sled structure without requiring material alterations to that structure; and without requiring parts of the sled to be especially constructed for use with said means. Consequently, my runner protecting means may be readily incorporated in newly manufactured sleds or added to previously manufactured ones, thus being adapted for widespread use.

Still another object of the invention is to provide runner protecting means simple in construction but most effective in use, and which may be produced inexpensively, all of which makes said means still further adapted for widespread use and therefore adapted to provide practical protection for a maximum number of children.

Other objects of the present invention will appear in the following description and appended claim, reference being had to the accompanying drawings forming a part of this specification wherein like reference characters designate corresponding parts in the several views.

Fig. 1 is a view in perspective of a sled construction embodying one form of the present invention;

Fig. 2 is a side elevation of the rear portion of a sled structure embodying another form of the invention;

Figs. 3 and 4 are views similar to Fig. 2 but show further forms of the invention; and Fig. 5 is a side elevation of the rear portion of a sled structure embodying still another form of the present invention, with a portion in section to show more clearly the means for connecting the runner ends with other parts of the sled structure.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

One preferred embodiment of my invention is shown herein by way of example in Fig. 1. As there shown, the sled structure may include a platform or deck indicated generally at 10. This platform or deck may be of any suitable structure; for instance, it may comprise slats or boards, as shown in Fig. 1, attached to suitable transverse supports or bolsters 11 disposed between the deck at various points where required. Extending along each side of the sled construction is one of a pair of wooden side rails 12 and 13. Viewing the sled from back to front, the side rail 12 is disposed along the left side of the sled structure, and the side rail 13 is disposed along the right side thereof. These side rails are supported by the laterally extending ends of the bolsters 11; and are secured thereto by any suitable fastening elements, such as the rivets 14, 14 and 15, 15. These side rails 12 and 13 are provided with extending end portions projecting rearwardly of the rear bolster 11.

In view of the foregoing, it will be understood that the platform or deck 10, the bolsters 11, and the side rails 12 and 13 form a top member or portion of the sled structure to which the remaining parts of said structure are attached.

Among such remaining parts of the sled structure are the runners 16 and 17, which are connected to the aforesaid top portion, and are vertically spaced therefrom. These runners may be connected to the top portion by any suitable means, for example, supports or knees 18 and 19 may be attached to the runners and also to the lower side of the bolsters 11 in the manner indicated clearly in Fig. 1. In this connection, the rivets 14, 14 and 15, 15 utilized to connect the side rails 12 and 13 to bolsters 11, may also connect the supports or knees 18 and 19 to said bolsters, as also shown in Fig. 1. However, separate fastening means may be utilized to connect the knees to the bolsters; and also to connect the bolsters to the side rails, if preferred. It will be observed that one of the pair of runners 16 and 17 is disposed in substantially the same vertical plane with one of the pair of side rails 12 and 13. Accordingly, throughout most of its length the left runner 16 underlies the left side rail 12, while the right runner 17 similarly underlies the right side rail 13. However, the rearwardly extending ends of the runners are connected to the rearwardly extending ends of the side rails in the manner explained hereinafter.

The runners 16 and 17 extend upwardly and forwardly at their front ends and are fixed to a suitable bumper bar in the manner indicated in Fig. 1. However, this particular structural feature does not pertain to the present invention and is therefore not described in detail. Furthermore, the steering mechanism as well as the metallic side bar members 12a and 13a, all of which are illustrated in Fig. 1, may be of any suitable construction so that a detailed description thereof is not necessary herein.

As shown in Fig. 1, the runners 16 and 17 are provided with rearwardly extending portions projecting beyond the rear knees 19. These rearwardly extending portions are upwardly turned or bent, as shown at 20 and 21. Moreover, the rearwardly extending portions of the runners 16 and 17 preferably project in a rearward direction further than the extending portions of the side rails 12 and 13. Also, the bent portions 20 and 21 of the runners preferably terminate somewhat below the horizontal plane in which the side rails 12 and 13 are disposed. Accordingly, the rear ends of the runners 16 and 17 are preferably spaced rearwardly of and below the rear ends of the side rails 12 and 13 respectively.

As indicated above, the reference numerals 22 and 23 represent a pair of angularly bent metallic tubular members. As shown in Fig. 1, each of these members is mounted on one of the side rails 12 or 13 and is telescoped over one of the upwardly bent ends 20 or 21 of the runners 16 and 17. Since the side rails are usually generally cylindrically shaped, the tubular member 22 is preferably generally circular in cross section and is dimensioned to provide a substantially cylindrical tube suited to receive the side rail 12. However, the tubular member 22 may be oval, or of any other configuration suited to receive the side rail 12 if said side rail is not cylindrically shaped. Thus, the tubular member 22 may be telescoped over the extending end of the side rail 12, and is fixed thereto. Any suitable fastening element may be used to secure the tubular member 22 to the side rail 12. For example, the rivet shown at 15 may be utilized for this purpose in addition to holding the side rail 12 to the bolster 11 and the bolster 11 to the knee 19. It will be understood, however, that a separate fastening element may be utilized to secure the tubular member 22 to the side rail 12.

As illustrated in Fig. 1, the tubular member 22 extends rearwardly in the same general plane as the side rail 12 until it lies substantially above the end of the upwardly bent portion of the runner 16. The tubular member 22 at approximately that point then bends downwardly and extends downwardly, being telescoped over the bent end 20 of the runner 16. Due to this particular configuration, illustrated in Fig. 1, the tubular member 22 is bent approximately at a right angle. However, it does not necessarily have to extend rearwardly in the same general plane as the side rail 12 until it is thus bent. It may be curved or bent other than right angularly; and in any suitable way, provided that it is constructed to be mounted on the side rail 12 and to fit over the upturned end 20 of the runner 16. The bent end 20 may extend within the tubular member 22 to any suitable extent; and the tubular member 22 does not necessarily have to snugly fit over the bent end of the runner, although the tubular member 22 may be shaped to provide such a snug fit, if desired. Also, it will be understood that the tubular member 22 is suitably constructed to fit over the end of the runner 20 no matter where that runner may terminate. Thus, the member 22 may extend to a greater or lesser extent beyond and rearwardly of the end of the side rail 12, depending upon whether the runner 20 is bent up near the knee 19 or further rearwardly thereof.

The tubular member 23 is mounted on the side rail 13 and telescoped over the end 21 of the runner 17 in a manner comparable to that of the tubular member 22, described in detail above.

In view of the foregoing, it will be understood that the tubular members 22 and 23 comprise means connecting the ends of the runners 16 and 17 with the rearwardly extending ends of the side rails 12 and 13 respectively. This connection provides guard means for the rear ends of the runners 16 and 17, and covers and protects said runner ends so that a child using the sled is not subjected to the risk of injury through accidental bodily contact with sharp or projecting runner ends. In fact, the most rearwardly extending parts of the present safety sled are the downwardly telescoping parts of the members 22 and 23 and the rounded portions 20 and 21 of the runners. Since these members provide a rounded, more or less continuous surface, it will be readily understood that bodily contact with this surface does not involve risk of injury.

In Fig. 2 there is illustrated another form of the present invention. In this form, the construction of the sled is the same as that described in connection with the embodiment of the invention shown in Fig. 1 except for the formation of the rear runner ends and the connection thereof to the side rails. As shown in Fig. 2, the rearwardly extending end portions of the runners (the runner 16 being the only one shown) are not only upturned but are generally arcuately bent and extend forwardly of the sled. This bend is so formed that the runners terminate immediately adjacent and beneath the end portion of the rearwardly extending part of the side rails. The bend of the runner 16 to so terminate adjacent the side rail 12 is illustrated in Fig. 2 and the runner 17 is similarly bent to terminate adjacent the side rail 13, although it is not expressly illustrated in Fig. 2. The portion of the runners 16 and 17 thus positioned are then respectively fastened to the rearwardly extending ends of the side rails 12 and 13 by suitable fastening elements, such as the rivets 24. It will therefore be understood that this construction shown in Fig. 2 also eliminates sharp extending runner ends, inasmuch as the only rearwardly extending portion of the runner is the rounded part, shown at 20 (Fig. 2). Accordingly, this construction provides a protecting means for the user of the sled; and prevents injury by accidental contact with sharp extending runner ends.

In Fig. 3 there is illustrated another form of the present invention which may also be utilized with a sled construction of the character described in detail in connection with the embodiment of the invention shown in Fig. 1. However, in this modification of the invention the runners have conventional straight rear end portions and are not upwardly bent (as in the form of the invention shown in Fig. 1), and are not bent in any direction at their extending rear end portions. In this modification of the invention, there is utilized a bent metallic piece 25 which is secured to the extremity of the rearwardly projecting end of the runner 16 as by rivets or other fastening elements in the manner indicated in Fig. 3. In this regard, the metallic piece 25 may possess a slot adapted to fit over the upwardly projecting ridge portion of the runner 16. However, this metallic piece 25 is positioned at the extremity of the runner 16 and covers or protects the sharp projecting end thereof. This bent metallic piece 25 extends generally upwardly and forwardly of the sled and terminates within a slot 26 formed in the rearwardly extending end portion of the side rail 12. This terminal part of the metal piece 25 is secured in the slot 26 by any suitable means. For instance, the pin or rivet shown in 27 may be employed. It will be readily understood that the metallic bent piece 25 serves as a guard or protecting means for the sharp rearwardly extending end of the runner 16. It will also be readily understood that the runner 17, although not shown in Fig. 3 is provided with a metallic piece similar to the piece 25. This metallic piece connects the extremity of the runner 17 to the side rail 13, also not shown, in the same manner described immediately above in connection with the runner 16 and side rail 12.

In Fig. 4 there is illustrated a further modification of the invention. As there shown, the rear knee 19 is provided with a generally rearwardly and downwardly extending leg 31 which terminates in an end part possessing a slot fitted over the upwardly projecting ridge of the runner 16. This leg 31 may be secured to the runner at that point by any suitable means, such as the rivet illustrated in Fig. 4. It will be noted that the extremity of the leg 31 extends over and covers the extremity of the runner 16; and thereby provides guard means protecting the user of the sled from the injury through contact with the sharp end of the runner 16. A rear knee of similar construction may be employed to protect the rear end of the runner 17.

In Fig. 5 there is illustrated still another modification of the invention. In this modification it will be noted that the rearwardly extending portion of the side rail 12 is bent downwardly, as shown at 32, and terminates in a slotted portion which fits over the upwardly extending bend 20 of the runner 16. The downwardly bent side rail and upwardly turned runner 16 are joined together. The terminus of the upward bend 20 of the runner 16 is inserted in the slot in the downwardly bent part 32 of the side rail, and the runner and rail are held in this assembled relation by any suitable means, such as the rivet or pin 33. However, any suitable fastening means may be utilized for this purpose. Also, it is preferable to provide an annulus or ring 34 surrounding the downturned portion 32 of the side rail 12 at the connection between the rail and the runner 16. This ring 34 reinforces and strengthens the wooden side rail at that point, and tends to prevent splitting of the side rail. In view of the connection between the upturned portion 20 of the runner 16 and the downturned portion 32 of the side rail 12, it is apparent that the end of the runner 16 is covered by the said downturned portion 32 and is thereby guarded. Accordingly, the user of the sled is not subject to the risk of injury due to sharp extending ends of the runner 16. Of course, the runner 17 can be protected in an entirely similar way.

In view of the foregoing, it will be appreciated that my invention provides a simple, inexpensive but effective guard means for the runner ends of sleds, which means may be utilized with a minimum of changes in conventional sled structures, and which may be utilized to protect straight-ended or up-bent runner ends. Thus, my invention is adapted for widespread use on newly fabricated sleds or may be added to prefabricated sleds to protect children from the painful cuts or injuries heretofore too often sustained by them because of accidental bodily contact with the sharp projecting rear runner ends of conventional sleds.

I claim:

A sled construction comprising a top deck having a transverse bolster, a pair of side rails extending along the sides of said deck and terminating in rearwardly extending ends, said rails being positioned respectively on the opposite ends of said transverse bolster, a pair of runners underlying said rails and being connected to said deck and terminating in rearwardly extending upturned free ends, a pair of guard members for protecting the user of the sled from bodily contacting the rearward ends of said side rails and runners, each of said guard members having its one end telescoped over one of the rearwardly extending ends of said rails and its other end telescoped over the upturned free end of the corresponding underlying runner, and means securing each of said rails and its respective guard member to the said transverse bolster.

MAX A. HOLBROOK.

REFERENCES CITED

The following references are of record in the file of this patent:

UNITED STATES PATENTS

| Number | Name | Date |
| --- | --- | --- |
| 742,485 | Perry | Oct. 27, 1903 |
| 1,722,012 | Michilli | July 23, 1929 |
| 2,183,638 | Bowen et al. | Dec. 19, 1939 |
| 2,233,012 | Holbrook | Feb. 25, 1941 |
| 2,289,426 | Holbrook | July 14, 1942 |

FOREIGN PATENTS

| Number | Country | Date |
| --- | --- | --- |
| 85,550 | Austria | Sept. 10, 1921 |